(12) United States Patent
Gomes et al.

(10) Patent No.: US 7,386,995 B2
(45) Date of Patent: Jun. 17, 2008

(54) DEVICE FOR PRODUCING DRY ICE AND PRESSURE RELIEF THEREOF

(75) Inventors: Francis Gomes, Jersey City, NJ (US); David Landsberger, Caldwell, NJ (US); Bruce Feller, Wayne, NJ (US)

(73) Assignee: Bel-Art Products, Inc., Pequannock, NJ (US)

( * ) Notice: Subject to any disclaimer, the term of this patent is extended or adjusted under 35 U.S.C. 154(b) by 382 days.

(21) Appl. No.: 11/064,212

(22) Filed: Feb. 23, 2005

(65) Prior Publication Data

US 2006/0185387 A1 Aug. 24, 2006

(51) Int. Cl.
*F25J 1/00* (2006.01)

(52) U.S. Cl. ....................................... 62/604
(58) Field of Classification Search ................ 62/602, 62/604, 534
See application file for complete search history.

(56) References Cited

U.S. PATENT DOCUMENTS

| | | | | |
|---|---|---|---|---|
| 1,965,922 A | * | 7/1934 | Fievet | 62/604 |
| 2,096,584 A | * | 10/1937 | Hill | 62/604 |
| 2,155,956 A | * | 4/1939 | Planer | 62/602 |
| 2,217,169 A | * | 10/1940 | Hill | 62/602 |
| 3,768,952 A | * | 10/1973 | Connolly | 425/451.5 |
| 4,095,830 A | * | 6/1978 | Spellman | 292/288 |
| 4,195,491 A | * | 4/1980 | Roncaglione | 62/384 |
| 4,374,658 A | | 2/1983 | Kawaguchi | |

FOREIGN PATENT DOCUMENTS

| | | | |
|---|---|---|---|
| GB | 2130701 | | 6/1984 |
| JP | 61-31869 | * | 2/1986 |
| JP | 2004218937 | | 8/2004 |

OTHER PUBLICATIONS

Bel-Art Products Catalog 204 entitled "ScienceWare—Tools for Science from Bel-Art Products" 2004, p. 58.
Bel-Art Products Catalog No. H28878-0010 Instructions Pamphlet for "Frigimat Dry Ice Maker"—2003.
Bel-Art Products Catalog No. H38876-0000 Instructions Pamphlet for "Economy Frigimat Dry Ice Maker"—2003.

* cited by examiner

*Primary Examiner*—William C Doerrler
(74) *Attorney, Agent, or Firm*—Lawrence G. Fridman

(57) ABSTRACT

A device for producing a solidified block of carbon dioxide includes first and second housing portions removably connectable together. The first and second housing portions form an interior molding chamber that is adapted to receive liquid carbon dioxide at a pressure where expansion of the liquid carbon dioxide occurs, resulting in a mixture of solidified and gaseous carbon dioxide. A pressure relief device includes a biasing member for biasing the first and second housing portions together. The biasing member permits relative movement between the first and second housing portions when internal pressure from the gaseous carbon dioxide exceeds a predetermined amount. With this arrangement, relative movement between first and second housing portions causes gaseous carbon dioxide to be released from the interior molding chamber to thereby reduce the internal pressure.

21 Claims, 8 Drawing Sheets

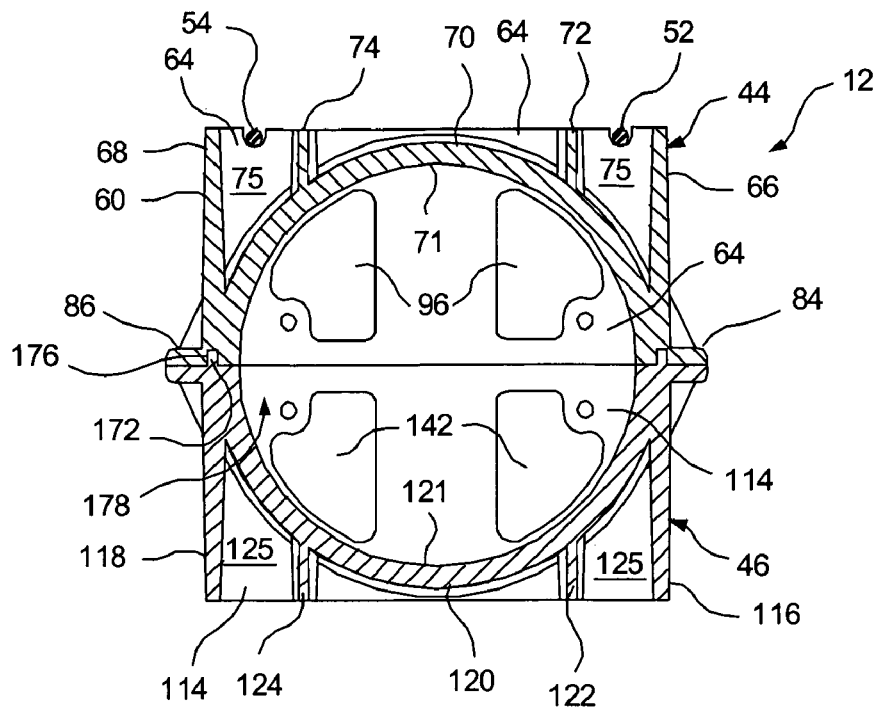
F I G. 9
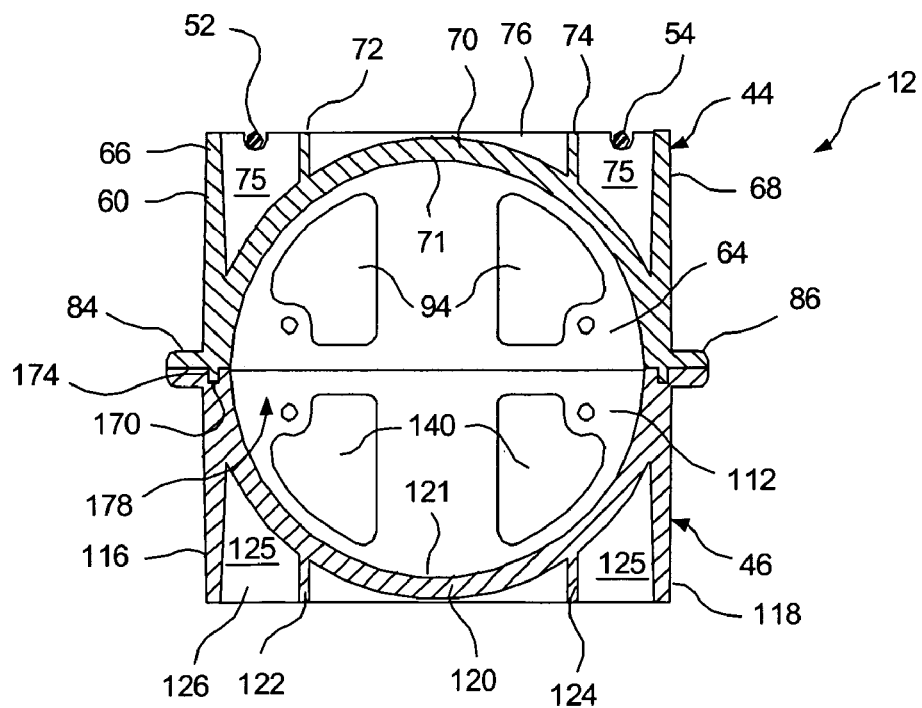
F I G. 10

DEVICE FOR PRODUCING DRY ICE AND PRESSURE RELIEF THEREOF

BACKGROUND OF THE INVENTION

The present invention relates generally to an apparatus for producing dry ice from liquid carbon dioxide, and more particularly to a device for automatically regulating or relieving pressure within an interior chamber of a dry ice producing housing.

A well-known method for making dry ice involves dispensing liquid carbon dioxide from a pressurized tank, which is typically held at approximately 800 psi, into a chamber at a pressure below approximately 70 psi, such as at atmospheric pressure. As the liquid carbon dioxide is dispensed, a portion of it changes into carbon dioxide snow through adiabatic expansion and accumulates in the chamber to form a low to medium density block of dry ice, while the remaining portion is directly changed into a gaseous state and released to atmosphere outside the chamber. If desired, the dry ice inside the chamber may then be compacted to form a higher density block.

Once formed, the dry ice can be used in place of ice for cooling substances, keeping substances in a frozen state, carbonating beverages, and so on. With time and the absorption of heat, the dry ice sublimates and returns to its normal gaseous state. Because the dry ice absorbs large quantities of heat during the sublimation process, the rate of sublimation for dry ice is dependent upon its relative compactness, the ambient temperature and pressure surrounding the dry ice, as well as the available surface area for heat absorption.

A small, manually operated dry ice generating device is disclosed in U.S. Pat. No. 4,374,658 to Kawaguchi. This device includes a pressurized source of liquid carbon dioxide and a molding box that accumulates frozen carbon dioxide from a liquid carbon dioxide tank through a nozzle. When assembled, the molding box includes a base, four side walls secured to the base, and a top cover that is securely locked to the side walls through interlocking latches. The side walls of the molding box include a layer of filter material and a plurality of openings to allow the escape of gaseous carbon dioxide during dry ice formation.

Although this type of construction offers some measure of portability and convenience, overpressurization of the molding box with its attendant consequences does pose a concern. Theoretically, the internal pressure of the molding box could reach the internal pressure of the liquid carbon dioxide tank. Excessive pressure within the molding box can be caused by impeded gas flow through the filters when excessive formation and compaction of carbon dioxide snow on the filters occurs. Also, any moisture present on or in the filter or within the molding box due to cleaning or a humid environment could be converted into ice and thus impede the flow of gas. Moreover, if the valve of the pressurized tank is opened fully, an excessive amount of carbon dioxide gas could flow into the molding box and be unable to escape. The primary safety release valve could also become clogged or iced over.

In addition, without the benefit of seeing through the box and into the molding chamber, it may be difficult to ascertain when the dry ice block has reached an acceptable size as well as any problems that may occur during the formation process. Also, during and after formation of the dry ice block, injury may occur when the operator comes into direct contact with the molding box, especially when constructed of a thermally conductive material, since frozen carbon dioxide may be as low as −109° F. Accordingly, prior art molding boxes may include an insulating layer to protect the operator against injury caused by extremely low temperatures.

BRIEF SUMMARY OF THE INVENTION

According to one aspect of the invention, a device for producing a solidified block of carbon dioxide includes first and second housing portions that are removably connectable together. The first and second housing portions form an interior molding chamber that is adapted to receive liquid carbon dioxide at a pressure where expansion of the liquid carbon dioxide occurs, resulting in a mixture of solidified and gaseous carbon dioxide. A pressure relief device includes a biasing member for biasing the first and second housing portions together. The biasing member permits relative movement between the first and second housing portions when internal pressure from the gaseous carbon dioxide exceeds a predetermined amount. With this arrangement, relative movement between first and second housing portions causes gaseous carbon dioxide to be released from the interior molding chamber to thereby reduce the internal pressure.

BRIEF DESCRIPTION OF THE DRAWINGS

The foregoing summary as well as the following detailed description of the preferred embodiments of the present invention will be best understood when considered in conjunction with the accompanying drawings, wherein like designations denote like elements throughout the drawings, and wherein:

FIG. 9 is a sectional view of the housing taken along line 9-9 of FIG. 5;

FIG. 10 is a sectional view of the housing taken along line 10-10 of FIG. 5;

It is noted that the drawings are intended to depict only typical embodiments of the invention and therefore should not be considered as limiting the scope thereof. It is further noted that the drawings may not necessarily be to scale. The invention will now be described in greater detail with reference to the accompanying drawings.

DETAILED DESCRIPTION OF THE INVENTION

Figure 1:
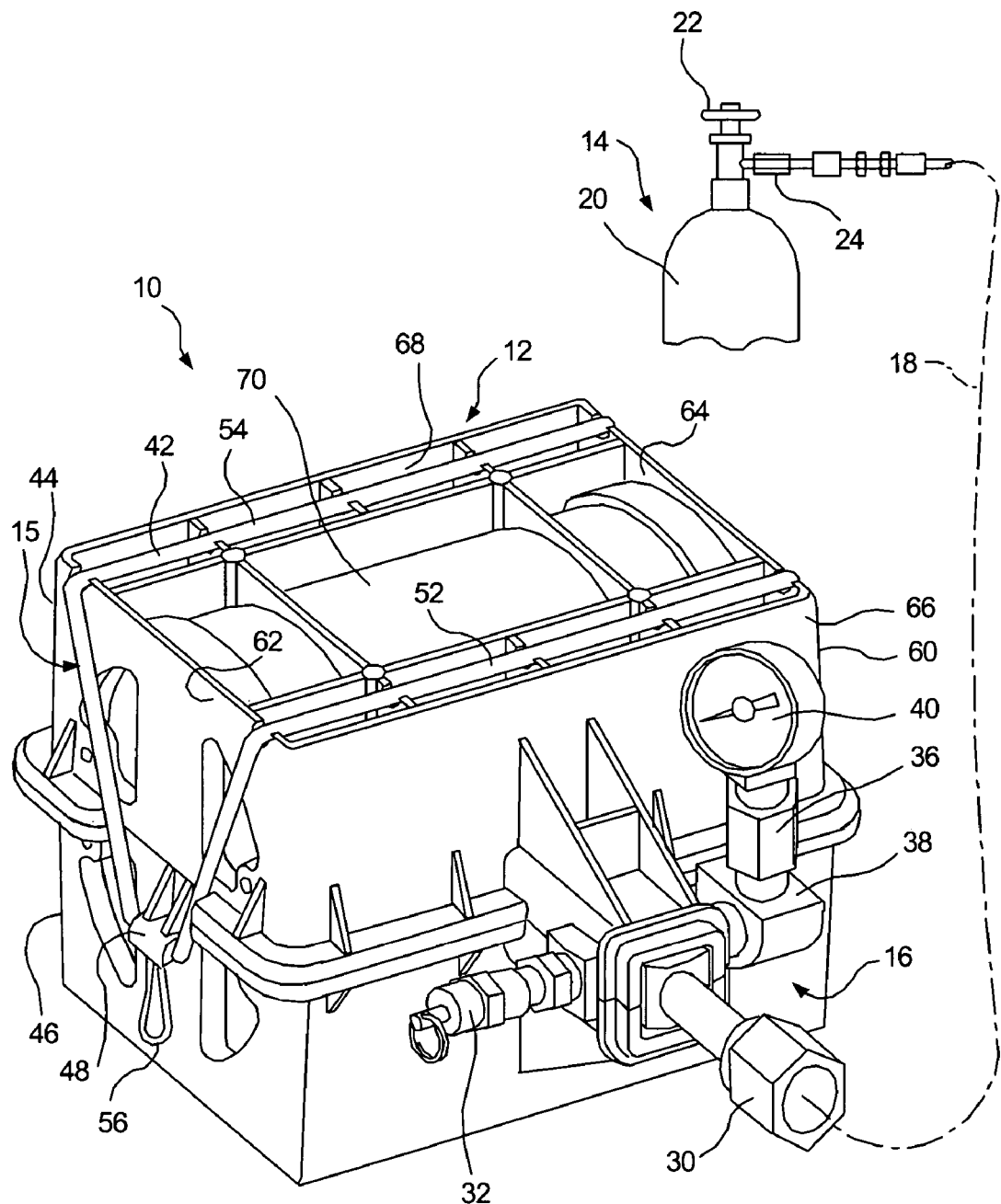
FIG. 1 is an isometric view of a dry ice forming system in accordance with the present invention.
Figure 2:
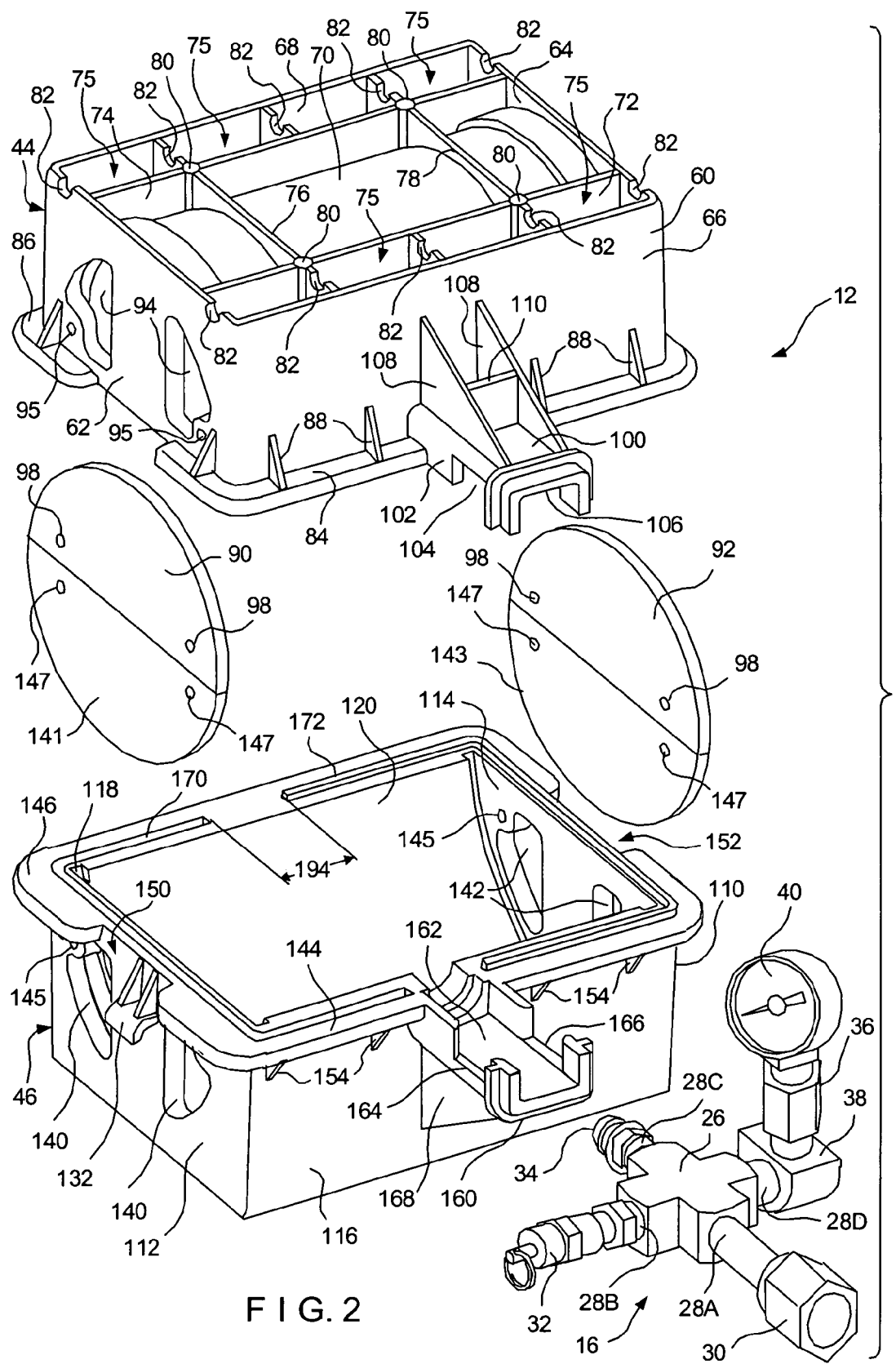
FIG. 2 is an exploded isometric view of the dry ice forming system of FIG. 1.

Referring to the drawings, and to FIGS. 1 and 2 in particular, a dry ice forming system 10 in accordance with the present invention is illustrated. The system 10 includes a housing 12 with a primary pressure relief device 15, a pressurized tank 14 of liquid carbon dioxide, and a metering assembly 16 mounted to the housing 12 and fluidly connected to the tank 14 through an insulated fluid delivery line or hose 18 (shown in phantom line).

The tank 14 is of well-known construction and includes a high pressure vessel 20 containing liquefied carbon dioxide, a valve 22 connected to the pressure vessel 20, and a connector portion 24 that connects the hose 18 to the valve 22. The valve 22 is preferably manually operable to control the flow of carbon dioxide leaving the pressure vessel 20.

As best shown in FIG. 2, the metering assembly 16 preferably includes a valve body 26 having four ports 28A, 28B, 28C and 28D in fluid communication with each other. An adaptor fitting 30 is connected between the first port 28A and the hose 18 (FIG. 1), a pressure relief valve 32 is connected to the second port 28B, an orifice or nozzle 34 is connected to the third port 28C, and a pressure gauge 36 is connected to the fourth port 28D. The pressure gauge 36 preferably includes a swivel connector 38 so that a dial face 40 of the gauge 36 can be positioned for convenient viewing during dry ice formation. The pressure relief valve 32 is of well-known construction and preferably functions as a secondary pressure relief device in the instant invention should the primary pressure relief device 15 fail. The primary pressure relief device 15 will be described in further detail below.

Referring to FIGS. 1-7, the housing 12 includes an upper housing portion 44 and a lower housing portion 46 that are removably held together with the primary pressure relief device 15. Preferably, the pressure relief device 15 is in the form of a biasing member, such as a continuous resilient cord 42 with opposite looped end sections 48 and 50 that are removably connected to opposite ends of the lower section 46 and a pair of middle leg sections 52 and 54 that stretch around the upper housing 44. The cord 42 is preferably constructed of an elastomeric material or the like so that the upper and lower housing portions are normally biased together. A lanyard 56 can be attached to the looped end section 48 and/or the looped end section 50 to facilitate installation and removal of the cord 42. It will be understood that the pressure relief device 15 may alternatively be connected to opposite sides of the lower housing portion 46. It will be further understood that the pressure relieve device 15 may be embodied as a non-continuous resilient strip or cord and/or more than one strip or cord or any other form that biases the housing portions together.

Preferably, the upper and lower housing portions 44, 46 are each integrally molded as a single unit out of a clear plastic material, such as acrylic, polycarbonate, nylon, and so on. The clear plastic material enables an observer to view the dry ice formation process for educational and laboratory purposes, to visually determine when the dry ice formation process is completed, to ascertain any problems that may occur within the housing 12 during dry ice formation, and to determine when liquid carbon dioxide from the tank 14 has been depleted.

The upper housing portion 44 preferably includes a continuous outer wall 60 with a front wall section 62, a rear wall section 64, and spaced side wall sections 66 and 68 that extend between the front and rear wall sections. An inner wall 70 extends between the front, rear and side wall sections and is preferably semi-cylindrical in shape. An inner surface 71 (FIGS. 8-10) of the inner wall 70 serves as an upper molding surface for the dry ice during its formation.

Longitudinal ribs 72 and 74 extend between the front and rear wall sections 62 and 64 while lateral ribs 76 and 78 extend between the side walls 66 and 68. The longitudinal and lateral ribs extend upwardly from the inner wall 70 and intersect with each other at joints 80, preferably in the form of generally cylindrical bosses. Notches 82 are formed in the front and rear wall sections 62 and 64 and the lateral ribs 76 and 78 between the wall 66 and longitudinal rib 72 and the wall 68 and longitudinal rib 74. The notches 82 are sized and shaped to receive the middle leg sections 52 and 54 of the continuous cord 42. The notches 82 together with the ribs ensure that the cord 42 is spaced away from the inner wall 70 to prevent possible freeze damage during dry ice formation.

With the above-described arrangement, the side wall sections 66 and 68 are spaced from the inner wall 70 and thus somewhat thermally isolated from the inner wall 70 by cavities 75 formed by the intersecting ribs. Accordingly, the upper housing portion can be manipulated by grasping the outer side wall sections with the reduced likelihood of frost burns or the like during dry ice formation or during separation of the housing portions to remove the dry ice. In addition, the plastic material itself serves as a thermal insulator over prior art thermally conductive materials, such as metal, to further reduce the likelihood of injury without the need for a separate insulating layer.

A pair of windows or openings 94 is formed in the front wall section 62 while a pair of windows or openings 96 is formed in the rear wall section 64 so that gases generated during dry ice formation can escape without excessive build-up of pressure within the housing 12. It will be understood that more or less windows may be formed in the upper housing portion and that they may be located at other places in addition to or alternately of the front and rear wall sections.

Upper filter sections 90 and 92 are positioned in the windows 94 and 96, respectively. The upper filter sections 90 and 92 are preferably semi-circular in shape and attached to the upper housing portion 44 by threaded fasteners (not shown) that extend through apertures 95 in the front and rear wall sections 62, 64 and corresponding apertures 98 in the upper filter sections 90, 92. It will be understood that other means for mounting the filters to the wall sections can be used, such as clamps, inner pockets formed in the wall sections, heat staking, ultrasonic welding, adhesives, and so on. The filters are preferably constructed of a porous plastic material, but any suitable material may be used.

Figure 8:
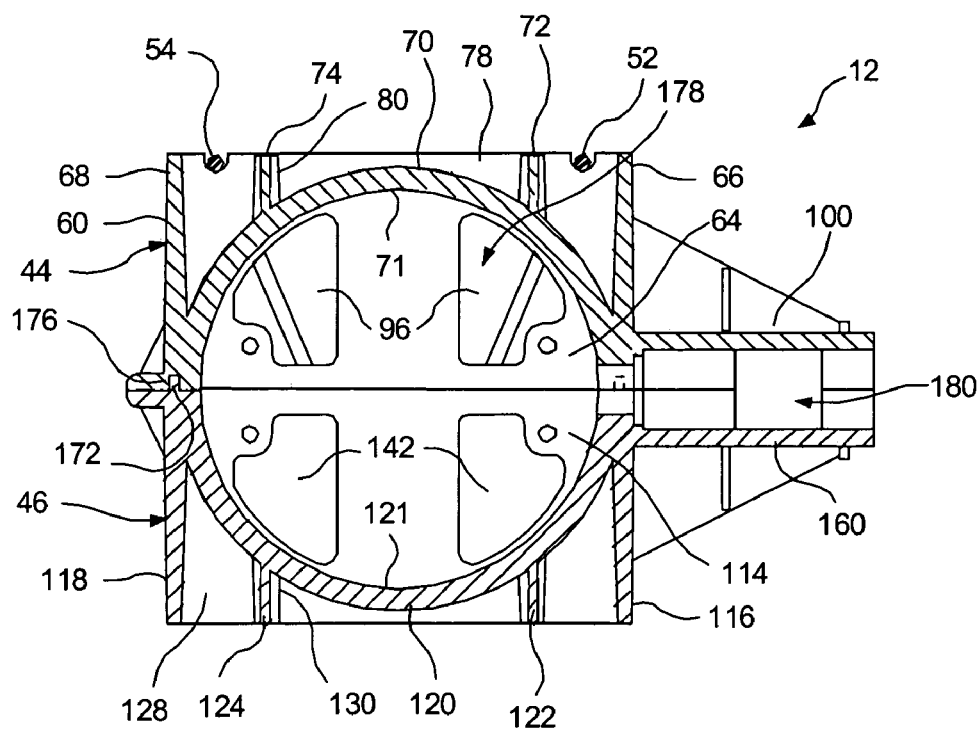
FIG. 8 is a sectional view of the housing taken along line 8-8 of FIG. 5.

With additional reference to FIGS. 8-10, a first lower flange segment 84 extends along the lower periphery of the front wall section 62, the side wall section 66, and the rear wall section 64. Likewise, a second lower flange segment 86 extends along the lower periphery of the front wall section 62, the side wall section 68, and the rear wall section 64. Front and rear gaps 90 and 92, respectively, are formed between the first and second lower flange segments to accommodate passage of the cord 42. A plurality of triangular-shaped reinforcing ribs 88 may extend between the flange segments and the wall sections.

As best shown in FIG. 2, an upper mounting bracket portion 100 extends outwardly from the side wall section 66 and includes an upper inverse U-shaped member 102 with opposing front and rear notches 104 and 106, respectively.

Preferably, spaced triangular-shaped reinforcing ribs 108 extend between the member 102 and the side wall section 66 and a longitudinal reinforcing rib extends between the ribs 108.

With particular reference to FIGS. 2 and 7-10, the lower housing portion 46 is similar in construction to the upper housing portion 44 and preferably includes a continuous outer wall 110 with a front wall section 112, a rear wall section 114, and spaced side wall sections 116 and 118 that extend between the front and rear wall sections. An inner wall 120 extends between the front, rear and side wall sections and is preferably semi-cylindrical in shape. An inner surface 121 (FIGS. 8-10) of the inner wall 120 serves as a lower molding surface for the dry ice during its formation. When the upper and lower housing portions 46 are assembled, the inner surfaces 71 and 121 form a generally cylindrical interior molding chamber to thereby form a correspondingly shaped block of dry ice. It will be understood that the inner wall 70 and/or the inner wall 120 can be of any desired cross sectional shape, such as square, triangle, oval, and so on, to thereby form a similarly shaped block of dry ice.

Longitudinal ribs 122 and 124 extend between the front and rear wall sections 112 and 114 while lateral ribs 126 and 128 extend between the side wall sections 116 and 118. The longitudinal and lateral ribs extend downwardly from the inner wall 120 and intersect with each other at joints 130, preferably in the form of generally cylindrical bosses.

As with the upper housing portion 44, the side wall sections 116 and 118 of the lower housing portion 46 are spaced from the inner wall 120 and thus somewhat thermally isolated from the inner wall by cavities 125 formed by the intersecting ribs. Accordingly, the lower housing portion can be manipulated by grasping the outer side wall sections with the reduced likelihood of frost burns or the like during dry ice formation or during separation of the housing portions to remove the dry ice. In addition, the plastic material itself serves as a thermal insulator over prior art thermally conductive materials to further reduce the likelihood of injury.

Figure 3:
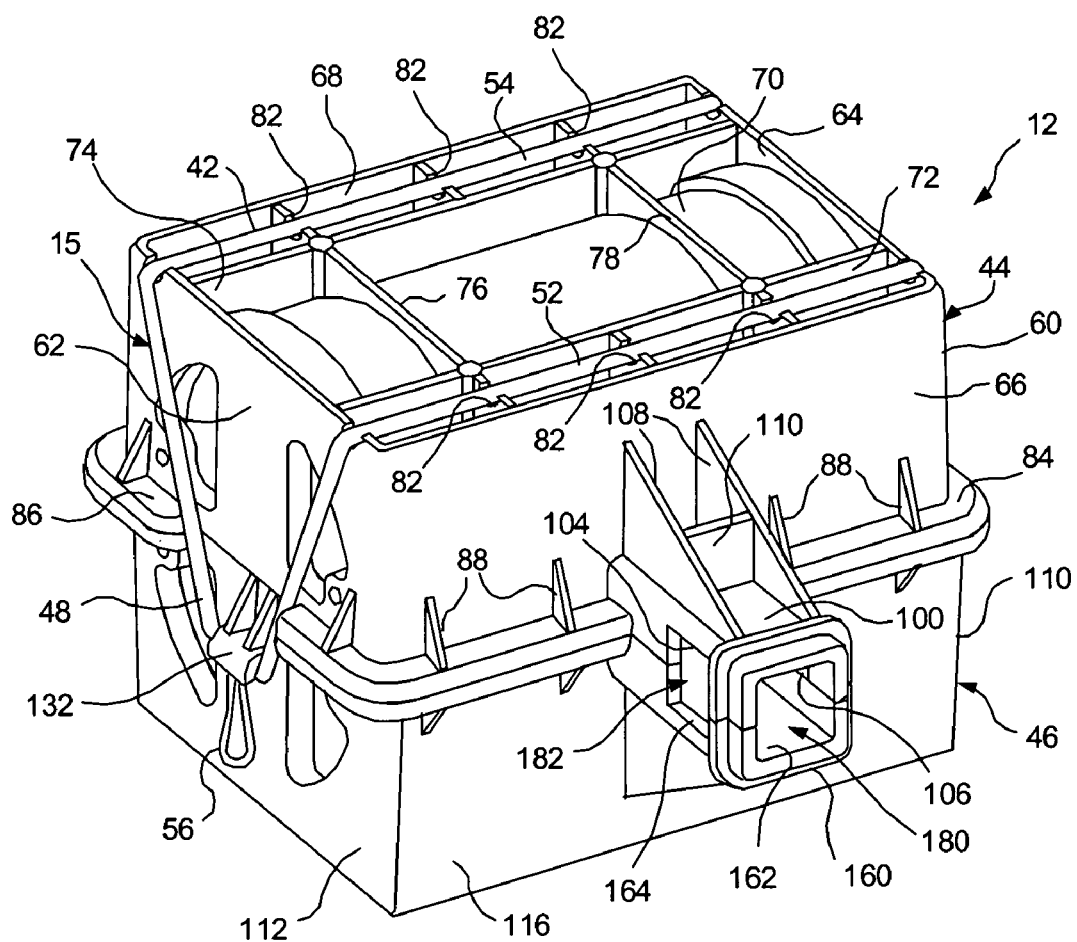
FIG. 3 is an isometric view of a dry ice forming housing that forms part of the system of FIG. 1.
Figure 4:
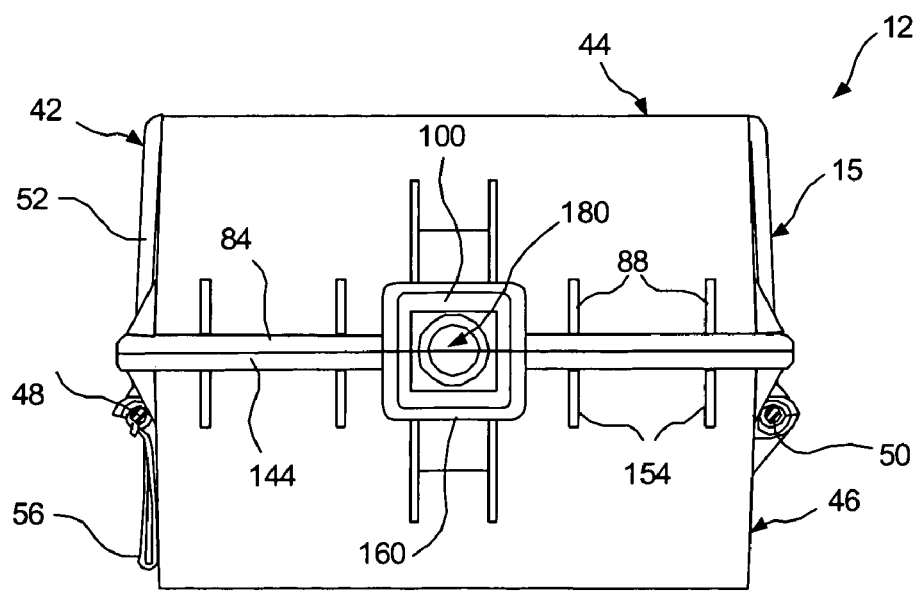
FIG. 4 is a side elevational view of the housing.
Figure 5:
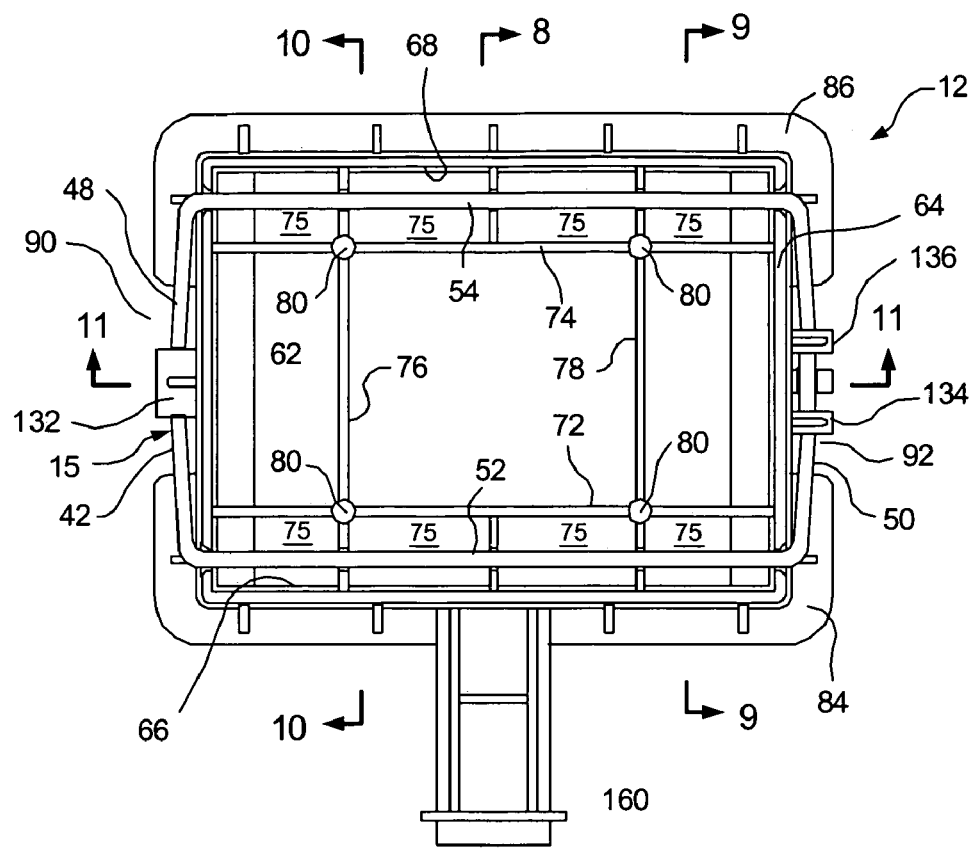
FIG. 5 is a top plan view of the housing.
Figure 6:
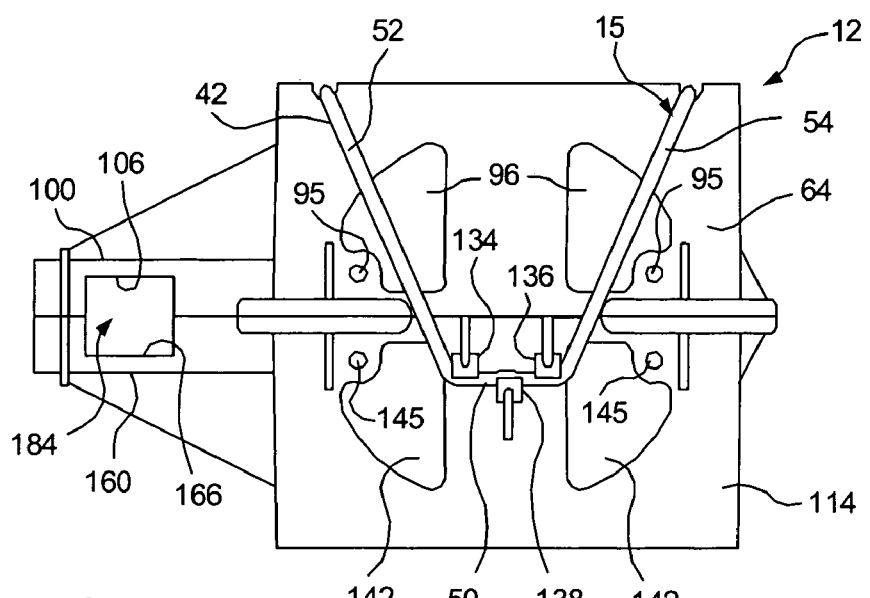
FIG. 6 is a rear elevational view of the housing.
Figure 7:
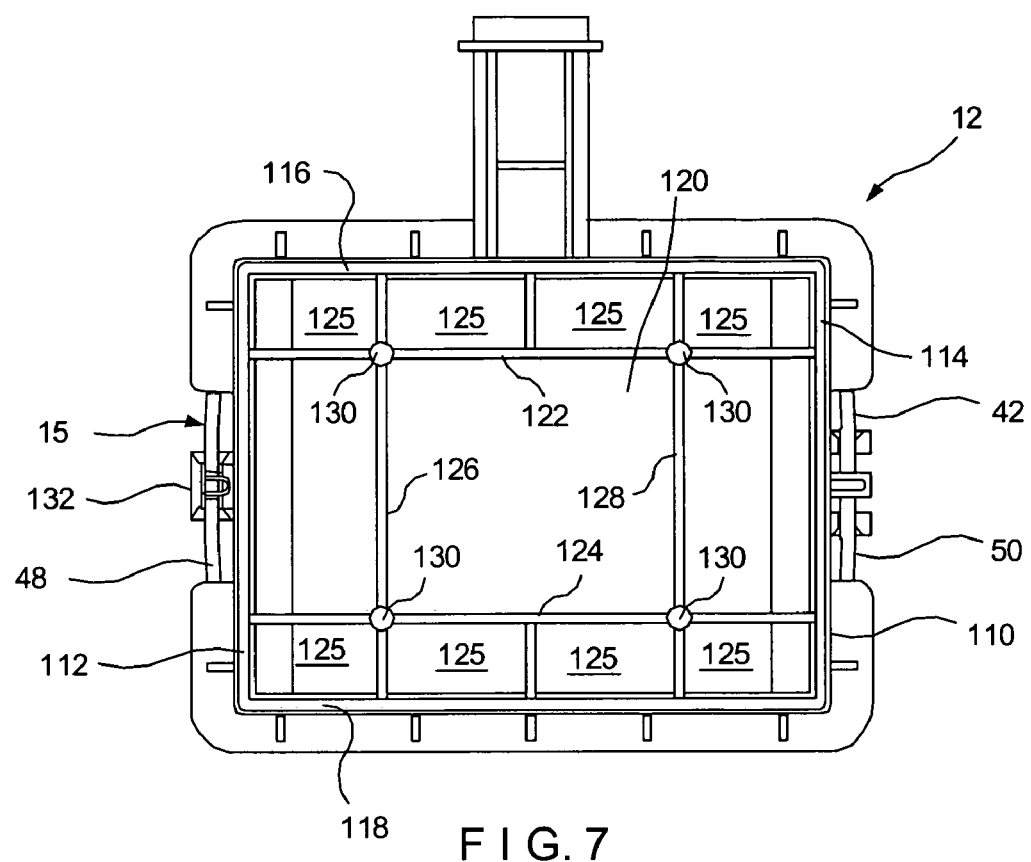
FIG. 7 is a bottom plan view of the housing.

As shown in FIGS. 2, 3 and 6, a front hook 132 is formed on the front wall section 112 and spaced rear hooks 134, 136 are formed on the rear wall section 114 of the lower housing portion 46. A rear guide member 138 is also formed on the rear wall section 114 at a location below and central to the rear hooks 134, 136. The front hook 132 is shaped to receive the looped end section 48 of the continuous cord 42. Likewise, the rear hooks 134, 136 are shaped and positioned to receive the looped end section 50. The rear hooks 134, 136 together with the rear guide member 138 inhibits removal of the cord 42 from the lower housing portion 46 even when the looped end section 48 is removed from the front hook 132.

A pair of windows or openings 140 is formed in the front wall section 112 while a pair of windows or openings 142 is formed in the rear wall section 114 of the lower housing portion 46 so that gases generated during formation of the dry ice can escape without excessive build-up of pressure within the housing 12. It will be understood that more or less windows may be formed in the lower housing portion and that they may be located at other places in addition to or alternately of the front and rear wall sections.

Lower filter sections 141 and 143 are positioned in the windows 140 and 142, respectively. The lower filter sections 141 and 143 are preferably semi-circular in shape and attached to the lower housing portion 46 by threaded fasteners (not shown) that extend through apertures 145 in the front and rear wall sections 62, 64 and corresponding apertures 147 in the lower filter sections 141, 143. It will be understood that other means for mounting the filters to the wall sections can be used, as previously described.

As best shown in FIGS. 2 and 8-10, a first upper flange segment 144 extends along the upper periphery of the front wall section 112, the side wall section 116, and the rear wall section 114. Likewise, a second upper flange segment 146 extends along the upper periphery of the front wall section 112, the side wall section 118, and the rear wall section 114. Front and rear gaps 150 and 152, respectively, are formed between the first and second upper flange segments to accommodate passage of the cord 42. A plurality of triangular-shaped reinforcing ribs 154 may extend between the flange segments and the wall sections.

As shown in FIG. 2, a lower mounting bracket portion 160 extends outwardly from the side wall section 116 and includes a lower U-shaped member 162 with opposing front and rear notches 164 and 166, respectively. Preferably, spaced triangular-shaped reinforcing ribs 168 extend between the member 162 and the side wall section 116.

Referring again to FIGS. 2 and 8-10, the lower housing portion 46 includes a U-shaped groove 170 that is formed in the upper end of the side wall sections 116, 118 and front wall section 112. A U-shaped tongue 172 extends upwardly from the side wall sections 116, 118 and rear wall section 114. The upper housing portion 44 includes a corresponding U-shaped groove 176 that is formed in the lower end of the side wall sections 66, 68 and rear wall section 64. Likewise, a corresponding U-shaped tongue 174 extends downwardly from the side wall sections 66, 68 and front wall section 62.

When the upper and lower housing portions are assembled, the first and second lower flange segments 84, 86 of the upper housing portion 44 abut the first and second upper flange segments 144, 146, respectively, of the lower housing portion 46 under bias from the continuous cord 42 to thereby create an interior molding chamber 178 between the inner walls 70 and 120. The position of the cord 42 in the notches 82 ensures that there is always a component of force pressing the flanges together. The U-shaped tongue 172 of the lower housing portion is received in the U-shaped groove 176 of the upper housing portion (FIGS. 8 and 9). Likewise, the U-shaped tongue 174 of the upper housing portion is received in the U-shaped groove 170 of the lower housing portion (FIG. 10). This arrangement ensures that the upper and lower housing portions are properly aligned and prevents their shifting during transportation and dry ice formation. The tongue and groove arrangement also serves to seal the upper and lower housing portions together when the flange segments are biased together, and serves to relieve pressure in a controlled manner when pressure within the housing exceeds a predetermined amount to cause the cord 42 to stretch and the housing portions to separate, as will be described in further detail below. The tongue and groove arrangement thus effectively removes the need for gaskets or similar sealing elements between the housing portions. It will be understood that the tongue may be entirely located on one of the housing portions and the groove may be entirely formed in the other of the housing portions.

Referring to FIGS. 1, 3, 4 and 6, the assembled housing portions also provide a means for quickly connecting and disconnecting the metering assembly 16 with the housing 12. As shown, the U-shaped member 103 of the upper bracket portion 100 abuts the U-shaped member 162 of the lower bracket portion 160 to form a hollow conduit 180 that receives and holds the valve body 26. Likewise, the upper and lower front notches 104, 164 together form an opening 182 that accommodates the pressure relief valve port 28B while the upper and lower rear notches 106, 166 together form an opening 184 that accommodates the pressure gauge port 28D.

Figure 11:
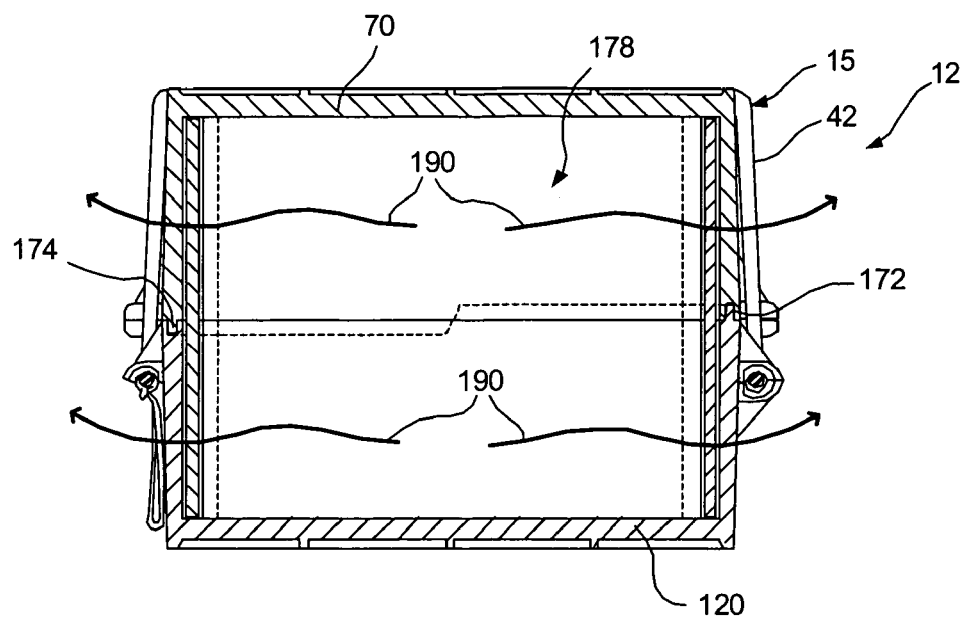
FIG. 11 is a sectional view of the housing taken along line 11-11 of FIG. 5.

In operation, the valve 22 of the tank 14 is opened to eject liquefied carbon dioxide into the interior molding chamber 178 through the nozzle 34 via the fluid hose 18. Due to the abrupt pressure differential between the tank 14 (approximately 800 psi) and the interior molding chamber 178 (initially at atmospheric pressure), adiabatic expansion of the liquid carbon dioxide occurs, resulting in a mixture of solidified and gaseous carbon dioxide within the chamber 178. The gaseous component normally exits the chamber 178 through the filter sections 90, 92, 141 and 143 and the windows 94, 96, 140 and 142 in the housing portions, as shown by arrows 190 in FIG. 11, while the solidified component accumulates inside the chamber. The relatively large surface area of the upper and lower filter sections together ensure that carbon dioxide gas generated during dry ice formation can safely escape from the housing under normal circumstances without excessive pressure build up.

Due to the transparent nature of the housing 12, an observer can, for both educational and production purposes, readily determine the progress of dry ice formation inside the chamber 178 and thus when the dry ice is sufficiently formed for removal. Accordingly, it is unnecessary to stop the dry ice formation process in order to determine whether formation of the dry ice to a desired density within the chamber has been completed. In addition, the observer can readily detect if and when the pressure vessel 20 is empty by directly observing whether dry ice is forming. In the past, the operator could only hear the rushing sound in the container, which could be either the sound of solidified and gaseous carbon dioxide or the sound of gaseous carbon dioxide only, the latter of which would indicate that the tank 14 is void of liquid carbon dioxide.

In order to remove the dry ice from the housing 12, the continuous cord 42 is removed from the upper housing portion 44 by pulling the lanyard 56 downwardly and away from the hook 48 of the lower housing portion 46. One or more of the outer walls 60, 110 can then be grasped by an operator to separate the housing portions and expose the dry ice for removal.

Figure 12:
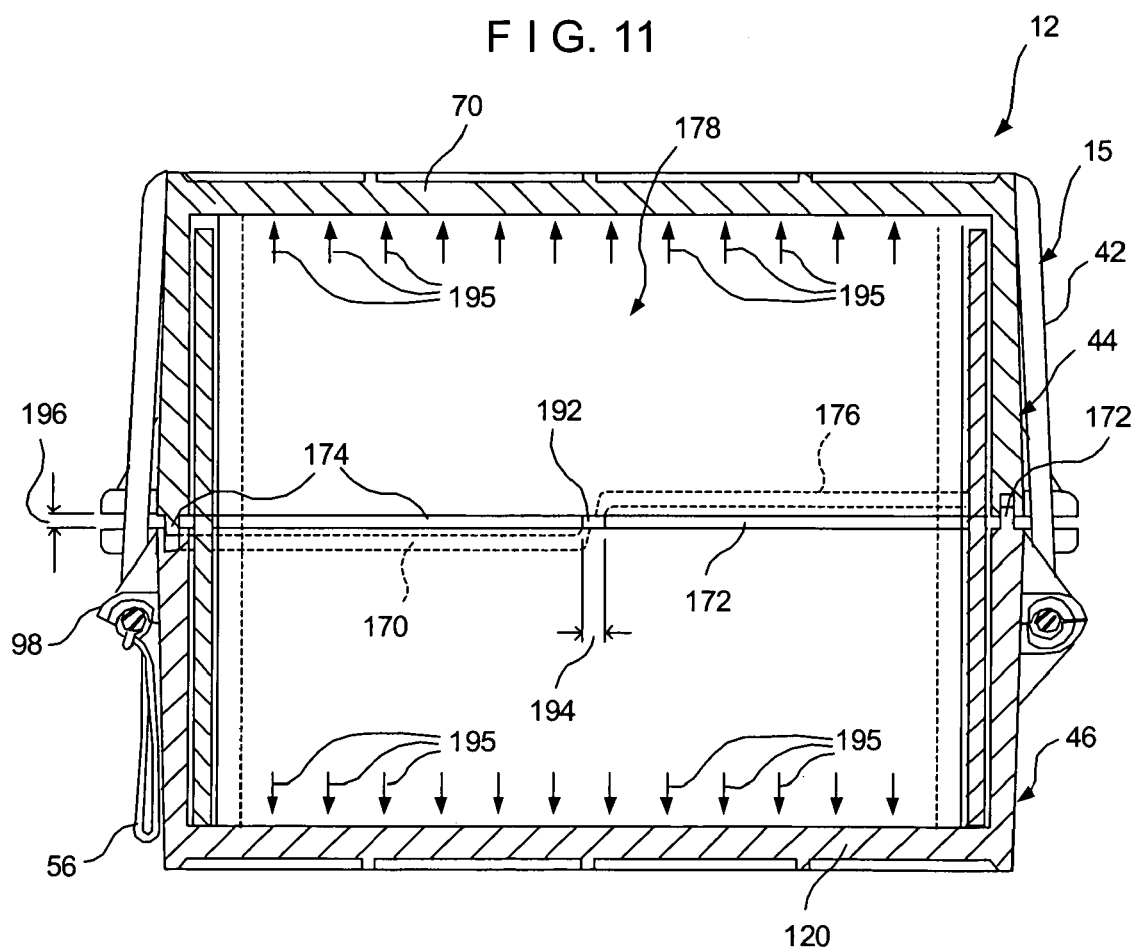
FIG. 12 is an enlarged sectional view similar to FIG. 11 showing mating housing portions in an expanded venting position.
Figure 13:
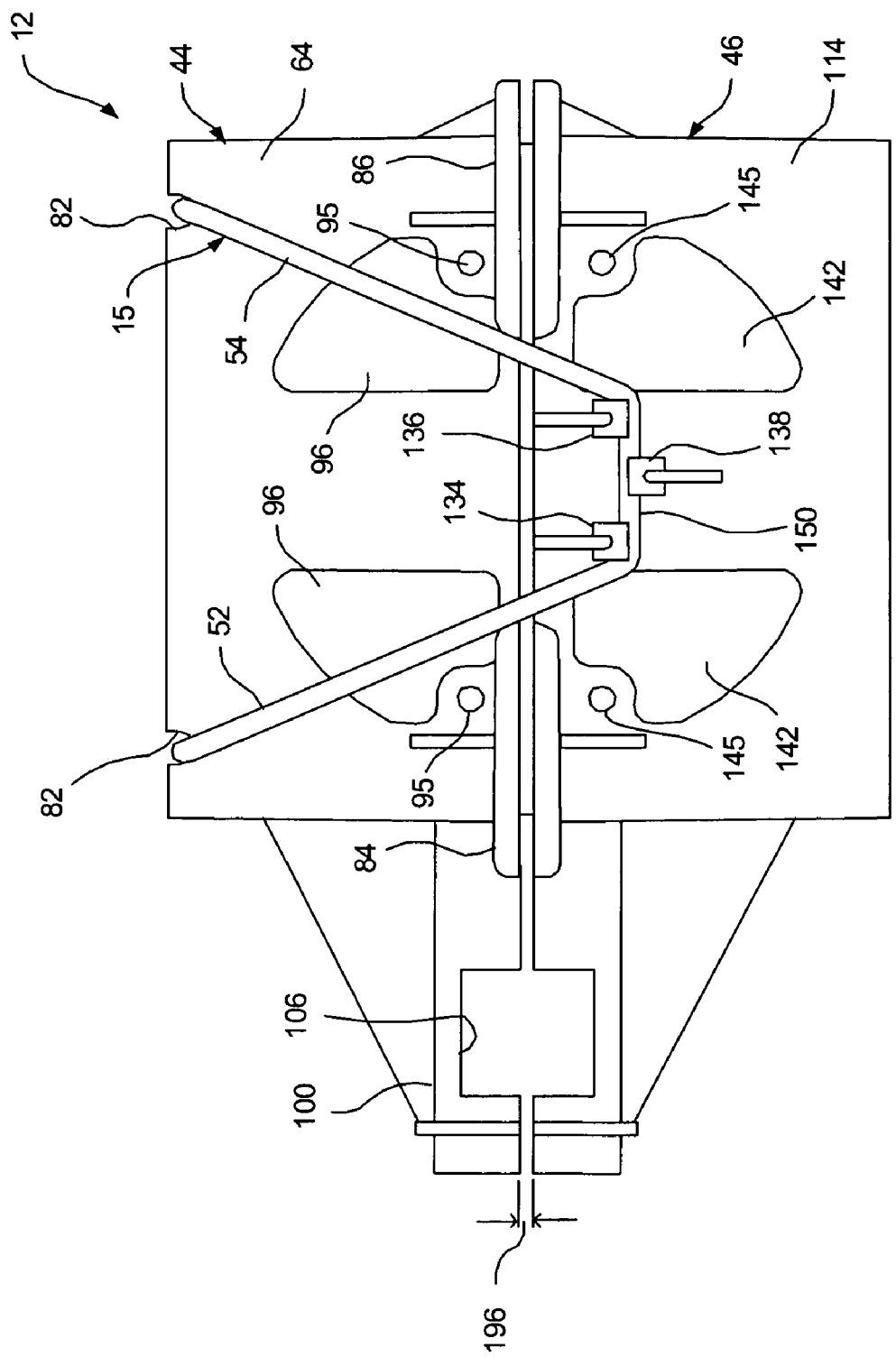
FIG. 13 is a rear elevational view similar to FIG. 6 showing the mating housing portions in the expanded venting position.

Referring to FIGS. 12 and 13, excessive pressure within the housing 12 may develop such as when the filters become clogged due to excessive formation and compaction of solidified carbon dioxide on the filters, frozen precipitates that may be present on or in the filters or within the molding chamber due to cleaning or a humid environment, and when the valve of the pressurized tank is opened sufficiently to cause an excessive amount of carbon dioxide gas to flow into the molding chamber. When this occurs, the primary pressure release device 15 stretches due to the pressure acting on the inner walls 70 and 120, as represented by arrows 195, to thereby cause separating movement between the housing portions 44 and 46.

As shown in FIG. 12, the tongue and groove arrangement ensures that the housing portions move in a controlled linear manner to form a pair of pressure relief openings 192 (only one shown) between the U-shaped tongue 172 of the lower housing portion 46 and the U-shaped tongue 174 of the upper housing portion 44. The width 194 of the pressure relief openings 192 is approximately the distance between the U-shaped tongue 172 and U-shaped groove 170 in the lower housing portion 46, as shown in FIG. 2. The height 196 of the pressure relief openings 192 will depend on the amount of excessive pressure within the housing 12 as well as the resiliency or yield strength of the cord 42 and the temperature at which the cord is exposed.

Should the primary relief device 15 fail to stretch for some reason, the secondary pressure relief device 32 is preferably automatically actuated. Accordingly, the pressure required to actuate the primary relief device 15 is preferably less than the pressure required to actuate the secondary relief device 32.

It will be understood that the term "preferably" as used throughout the specification refers to one or more exemplary embodiments of the invention and therefore is not to be interpreted in any limiting sense.

In addition, terms of orientation and/or position as may be used throughout the specification, such as but not limited to: lower, upper, front, rear, inner, outer, longitudinal, lateral, as well as their derivatives and equivalent terms, relate to relative rather than absolute orientations and/or positions.

It will be appreciated by those skilled in the art that changes could be made to the embodiments described above without departing from the broad inventive concept thereof. It will be understood, therefore, that this invention is not limited to the particular embodiments disclosed, but is intended to cover modifications within the spirit and scope of the present invention as defined by the appended claims.

What is claimed is:

1. A device for producing a solidified block of carbon dioxide, the device comprising:
   a first housing portion;
   a second housing portion adapted for connection with the first housing portion, the first and second housing portions together forming an interior molding chamber adapted to receive liquid carbon dioxide at a pressure where expansion of the liquid carbon dioxide occurs, resulting in a mixture of solidified and gaseous carbon dioxide; and
   a first pressure relief device comprising a biasing member for biasing the first and second housing portions together, the biasing member permitting relative movement between the first and second housing portions when internal pressure from the gaseous carbon dioxide exceeds a predetermined amount;
   wherein relative movement between the first and second housing portions causes gaseous carbon dioxide to be released from the interior molding chamber to thereby reduce the internal pressure.

2. A device according to claim 1, wherein the biasing member comprises a resilient cord having a front end section connected to the front wall section of the second housing portion, a rear end section connected to the rear wall section of the second housing portion, and a pair of middle sections extending between the front and rear end sections and over the first housing portion to thereby bias the first and second housing portions together.

3. A device according to claim 2, wherein the front and rear wall sections of the second housing portion comprise a front hook formation and a rear hook formation, respectively, such that the front end section is positioned over the front hook formation and the rear end section is positioned over the rear hook formation.

4. A device according to claim 1, wherein at least one of the first and second housing portions is constructed of a transparent material, so as to enable to observe formation of the solidified block of carbon dioxide within the interior molding chamber.

5. A device according to claim 1, and further comprising at least one window formed in at least one of the first and second housing portions and at least one filter positioned over the window for releasing carbon dioxide gas from within the interior molding chamber.

6. A device according to claim 1, wherein each of the first and second housing portions comprises:
   a continuous outer wall having a front wall section, a rear wall section, and spaced side wall sections extending between the front and rear wall sections; and
   an inner wall extending toward the outer wall, the inner walls of the first and second housing portions forming the interior molding chamber.

7. A device according to claim 6, wherein the outer wall is at least partially thermally isolated from the inner wall by at least one cavity.

8. A device according to claim 6, wherein each of the first and second housing portions further comprises:
   a plurality of longitudinal ribs extending between the front and rear wall sections and the inner wall; and
   a plurality of lateral ribs extending between the side wall sections and the inner wall, the lateral and longitudinal ribs intersecting to form a plurality of cavities between the inner wall and outer walls to thereby at least partially thermally isolate the outer wall from the inner wall.

9. A device according to claim 8, wherein each of the first and second housing portions is integrally molded as a unitary structure.

10. A device according to claim 3, and further comprising a plurality of notches in the front and rear wall sections and the lateral ribs of the first housing portion to accommodate the middle sections of the resilient cord.

11. A device according to claim 10, wherein the resilient cord is formed as a continuous ioop, and the notches are located adjacent the side wall sections of the upper housing portion.

12. A device according to claim 8, and further comprising:
   a first bracket portion extending from the first housing portion; and
   a second bracket portion extending from the second housing portion, the first and second bracket portions being adapted to receive a metering assembly therebetween.

13. A device according to claim 12, and further comprising a metering assembly positioned between the first and second bracket portions, the metering assembly being adapted for fluid communication between the interior molding chamber and a pressurized source of liquid carbon dioxide.

14. A device according to claim 6, wherein the continuous outer wall of one of the first and second housing portions comprises a tongue and the continuous outer wall of the other of the first and second housing portions comprises a groove for receiving the tongue to thereby align the first and second housing portions during assembly and provide controlled relative movement between the first and second housing portions when internal pressure from the gaseous carbon dioxide exceeds the predetermined amount.

15. A device according to claim 14, wherein the tongue and groove are positioned and shaped to create a pressure relief opening between the interior molding chamber and atmosphere during the relative movement.

16. A device according to claim 1, wherein one of the first and second housing portions comprises a tongue and the other of the first and second housing portions comprises a groove for receiving the tongue to thereby align the first and second housing portions during assembly and provide controlled relative movement between the first and second housing portions when internal pressure from the gaseous carbon dioxide exceeds the predetermined amount.

17. A device according to claim 16, wherein the tongue and groove are positioned and shaped to create a pressure relief opening between the interior molding chamber and atmosphere during the relative movement.

18. A device according to claim 1, and further comprising a secondary pressure relief device operably associated with the interior molding chamber, the secondary pressure relief device being actuated at a pressure above the predetermined amount.

19. A device for producing a solidified block of carbon dioxide, the device comprising:
   a first housing portion;
   a second housing portion adapted for connection with the first housing portion, the first and second housing portions together forming an interior molding chamber adapted to receive liquid carbon dioxide at a pressure where expansion of the liquid carbon dioxide occurs, resulting in a mixture of solidified and gaseous carbon dioxide;
   a biasing member having a front end section connected to a first wall section of the second housing portion, a rear end section connected to a second wall section of the second housing portion, and a pair of middle sections extending between the front and rear end sections and over the first housing portion, the front, middle and rear sections of the biasing member are formed as a continuous loop of resilient cord to thereby bias the first and second housing portions together; and
   the first and second housing portions are constructed of a transparent material, so as to enable to observe formation of the solidified block of carbon dioxide within the interior molding chamber.

20. A device according to claim 19, wherein the first and second wall sections of the second housing portion comprise a first hook formation and a second hook formation, respectively, such that the front looped end section is looped over the front hook formation and the rear looped end section is looped over the rear hook formation.

21. A device according to claim 3, wherein the front, middle and rear sections of the biasing member are formed as a continuous loop of the resilient cord.

* * * * *